United States Patent [19]

Okada

[11] 4,356,508
[45] Oct. 26, 1982

[54] BRIGHTNESS ADJUSTING CIRCUIT FOR A CATHODE RAY TUBE

[75] Inventor: Takashi Okada, Yokohama, Japan

[73] Assignee: Sony Corporation, Tokyo, Japan

[21] Appl. No.: 228,977

[22] Filed: Jan. 27, 1981

[30] Foreign Application Priority Data

Jan. 23, 1980 [JP] Japan .................................. 55-6667

[51] Int. Cl.³ ........................................ H04N 9/535
[52] U.S. Cl. ........................................ 358/29; 358/168
[58] Field of Search ........................... 358/29, 39, 168

[56] References Cited

U.S. PATENT DOCUMENTS

| | | | |
|---|---|---|---|
| 4,130,829 | 12/1978 | Kam et al. | 358/65 |
| 4,203,131 | 5/1980 | Harwood et al. | 358/34 |
| 4,285,008 | 8/1981 | Osawa et al. | 358/29 |

Primary Examiner—Richard Murray
Attorney, Agent, or Firm—Lewis H. Eslinger; Alvin Sinderbrand

[57] ABSTRACT

An automatic brightness adjusting circuit for a cathode ray tube is disclosed which includes a video signal source from which a video signal is derived, a cathode ray tube having an electrode normally supplied with the video signal derived from the video signal source, a reference signal source for producing a reference signal, a signal processing circuit between the video signal source and the cathode ray tube, a switching circuit for selectively supplying either the video signal derived from the video signal source or the reference signal to the signal processing circuit, the switching circuit supplying the reference signal to the signal processing circuit during a brightness adjusting period, a control signal generator connected to the signal processing circuit for supplying the latter with a control signal the level of which varies gradually during the brightness adjusting period, a level detector connected to the cathode ray tube for detecting a signal level at its electrode, and a control circuit responsive to the level detector for stopping the control signal generator from varying the control signal level and for actuating the switching circuit such that the latter supplies the video signal to the signal processing circuit when the detected signal level of the electrode exceeds a predetermined value. The adjusting circuit thus constructed can operate stably and perform the adjusting operation in a short period of time.

20 Claims, 11 Drawing Figures

BRIGHTNESS ADJUSTING CIRCUIT FOR A CATHODE RAY TUBE

BACKGROUND OF THE INVENTION

1. Field of the Invention

The present invention relates generally to an automatic brightness adjusting circuit for a cathode ray tube, and is directed more particularly to an automatic white balance adjusting circuit for a color cathode ray tube.

2. Description of the Prior Art

To effect brightness or white balance adjustment for a cathode ray tube of a television receiver, background adjustment and driving level adjustment operations are carried out. In a prior art color television receiver, the above adjustments are generally carried out in the output circuits for the primary colors R (red), G (green) and B (blue), resulting in an individual adjustment at each of the respective three positions. Even if the background adjustment of the television receiver is carried out correctly when the television receiver is forwarded from the factory whereat it is manufactured or assembled, the adjusted value may drift because of unstable factors of the associated circuits to shift the white balance. Therefore, the background adjustment must be adjusted again. As for the driving level adjustment, generally, once this adjustment is carried out correctly when the television receiver is forwarded from the factory, there is stable and hence it is almost no need to carry out the driving level adjustment again, except if and when the cathode ray tube is replaced.

In order to automatically achieve background adjustment, it has been proposed to detect the current of the cathode ray tube, and the detected current is fed back to the background adjusting circuit. However, background may not vary continuously, but may vary very gradually and over a long period of time, so that it is not necessary always to apply this feedback current. On the other hand, if the aforementioned feedback loop is provided, due to the mutual action of the transient responses of the usual ABL (automatic brightness limiter) circuit, video clamp circuit and the like, it takes a long period of time for the video channel to reach its steady state or stable background condition when the brightness of the picture varies rapidly and also when a different channel is selected. Further, since the aforementioned feedback circuit requires a low pass filter, it is not suitable to be made as an IC (integrated circuit).

OBJECTS AND SUMMARY OF THE INVENTION

Accordingly, an object of the present invention is to provide an automatic brightness adjusting circuit free from the defects encountered in the prior art.

Another object of the invention is to provide an automatic brightness adjusting circuit for a cathode ray tube which operates stably and performs the adjusting operation in a short period of time.

A further object of the invention is to provide an automatic brightness adjusting circuit for a cathode ray tube which is suitable to be made as an integrated circuit.

According to an aspect of the present invention, an automatic brightness adjusting circuit for a cathode ray tube is provided which comprises:

a video signal source from which a video signal is derived;

a cathode ray tube having an electrode normally supplied with the video signal derived from said video signal source;

a reference signal source for producing a first reference signal;

a signal processing circuit between said video signal source and said cathode ray tube;

a switching circuit for selectively supplying either said video signal derived from the video signal source or said reference signal to said signal processing circuit, said switching circuit supplying said reference signal to said signal processing circuit during a brightness adjusting period;

a control signal generator connected to said signal processing circuit for supplying the latter with a control signal the level of which varies gradually during the brightness adjusting period;

a level detector connected to said cathode ray tube for detecting a signal level at its electrode; and a control circuit responsive to said level detector for stopping the control signal generator from varying the control signal level and for actuating said switching circuit such that the latter supplies said video signal to said signal processing circuit when the detected signal level of said electrode exceeds a predetermined value.

Other objects, features and advantages of the present invention will become apparent from the following description taken in conjunction with the accompanying drawings in which like reference numerals designate the same elements and parts.

BRIEF DESCRIPTION OF THE DRAWINGS

FIG. 7 is a waveform diagram which is useful to explain the example shown in FIG. 6.

DESCRIPTION OF THE PREFERRED EMBODIMENTS

The present invention will be hereinafter described with reference to the attached drawings.

Figure 1:
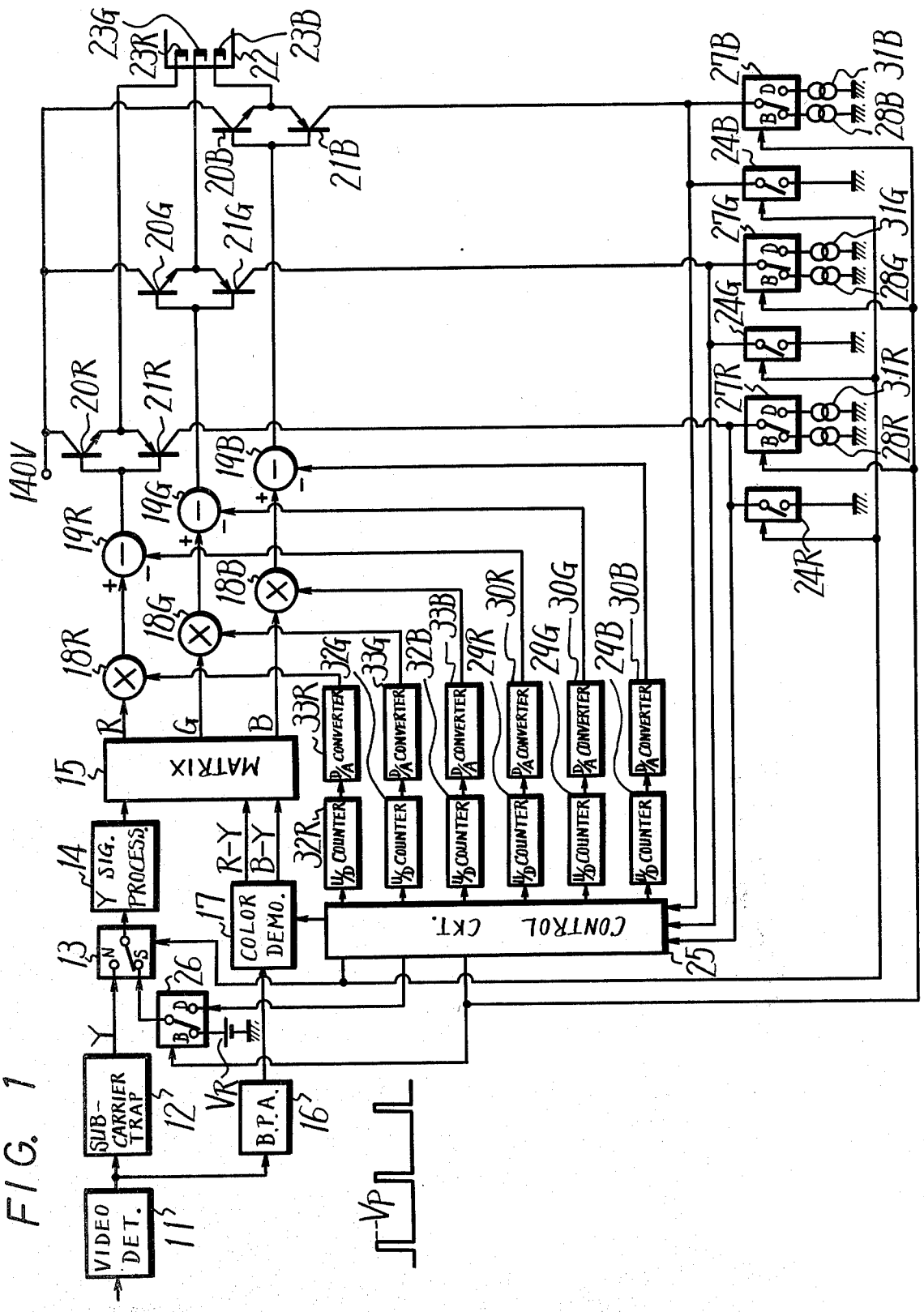
FIG. 1 is a block diagram showing an example of the automatic brightness adjusting circuit for a cathode ray tube according to the present invention.

A first example of the automatic brightness adjusting circuit for a cathode ray tube according to the invention will be now discribed with reference to FIG. 1.

In the example of FIG. 1, a composite video signal from a video detector circuit 11 is supplied to a sub-carrier trap circuit 12 from which a luminance signal Y is derived. During normal operation or reception, a switch 13 is changed over to be in contact with a contact N to supply the luminance signal Y to a luminance signal processing circuit 14 and thence to a matrix circuit 15. The composite video signal from the video detector circuit 11 is also fed to a band pass amplifier 16 from which a chrominance signal is derived. This chrominance signal is fed to a color demodulator circuit 17 from which red and blue color difference signals R-Y and B-Y are obtained. These color difference signals are fed to the matrix circuit 15 which then produces red, green and blue primary color signals R, G and B in response to the luminance and color difference signals supplied thereto. These primary color signals are supplied through multipliers 18R, 18G and 18B, respectively, which are used for driving level adjustment (gain adjustment) and then through subtraction circuits 19R, 19G and 19B, respectively, which are used for background adjustment. The outputs from the subtraction circuits are supplied to pairs of video output transistors 20R, 21R; 20G, 21G; and 20B, 21B whose outputs are supplied to cathodes 23R, 23G and 23B, respectively, of cathode ray tube 22 to drive the latter. Normally, switches 24R, 24G and 24B are turned ON to directly ground the collectors of the transistors 21R, 21G and 21B, respectively.

When a power switch (not shown) is turned ON, or when a channel is changed over from one to another, or when a specially provided adjusting switch (not shown) is turned ON, the background adjustment and the driving level adjustment operations can be automatically carried out in the following manner.

Figure 2:
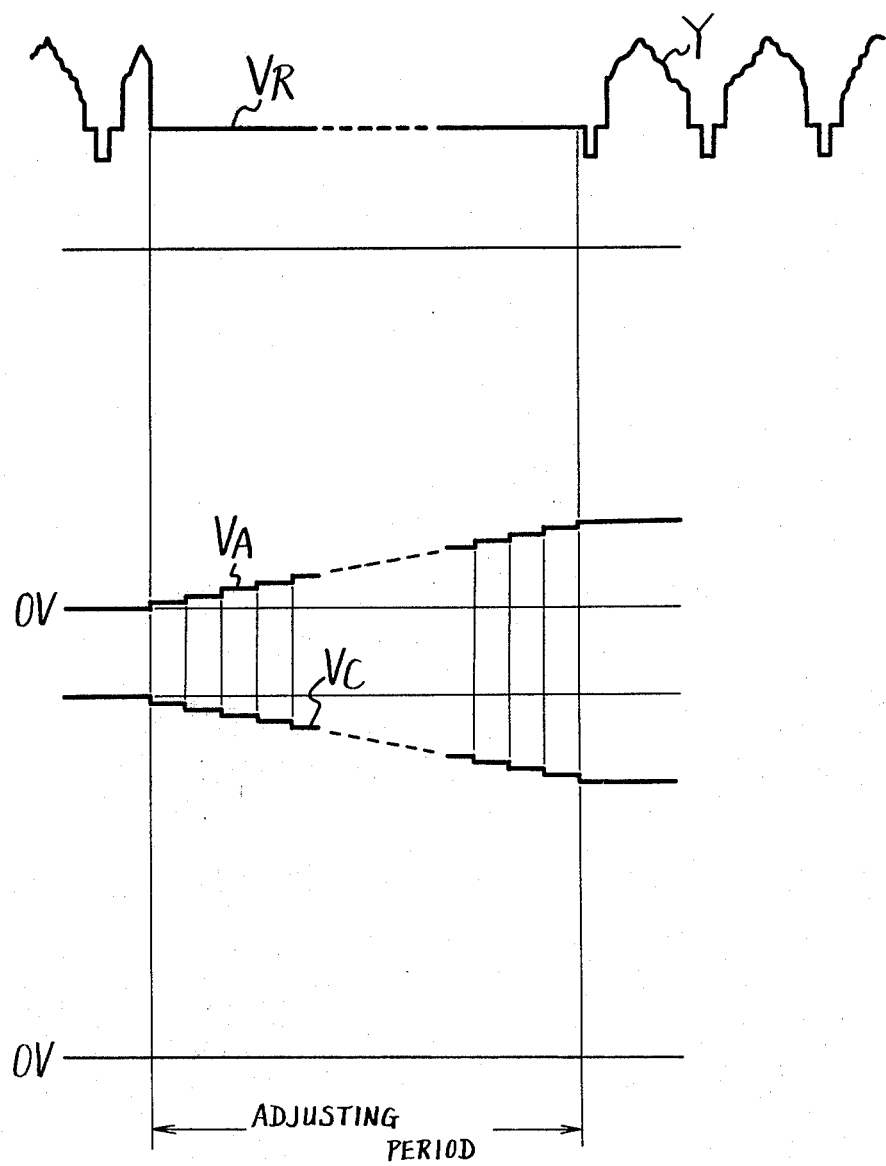
FIGS. 2 and 3 are waveform diagrams which are useful to explain the circuit shown in FIG. 1.

When the power switch is turned on, or when a channel is changed over from one to another, or when the specially provided adjusting switch is turned ON, a control circuit 25 produces control signals by which the switch 13 is changed over to a contact S and a switch 26 is changed over to be in contact with a contact B. Thus, in place of the luminance signal Y, a constant reference voltage $V_R$, which is set at the pedestal level of the luminance signal Y as shown in FIG. 2, is supplied from a reference voltage source $V_R$ through the switches 26, 13 to the luminance signal processing circuit 14 and thence to the matrix circuit 15. In this operation, the supply of the chrominance signal to the color demodulator circuit 17 is prevented and the circuit 17 is so controlled that the two output voltage therefrom become fixed and constant voltages. Thus, the output voltages normally representing the red, green and blue colors from the matrix circuit 15 now become constant voltages each corresponding to a color control level determined in response to the reference voltage $V_R$.

Figure 3:
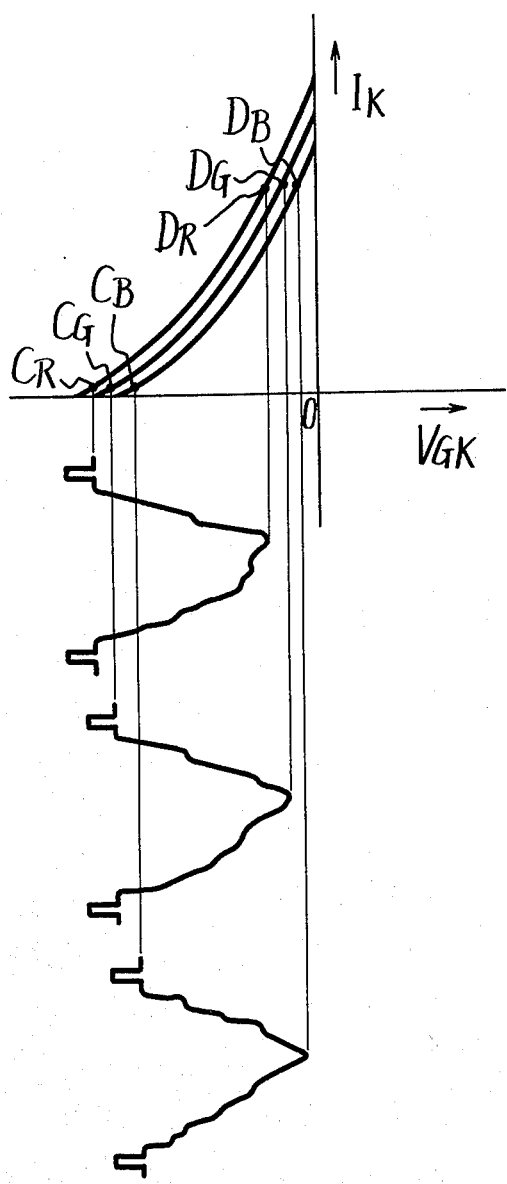

Control circuit 25, produces other control signals which turn respective switches 24R, 24G and 24B OFF and which change over each of switches 27R, 27G and 27B to be in contact with a contact B. Thus, the collectors of the transistors 21R, 21G and 21B are respectively grounded through constant current sources 28R, 28G and 28B, which are provided for detecting the levels of the cathode currents of the cathode ray tube 22. The currents from the constant current sources 28R, 28G and 28B are used to determine starting points $C_R$ $C_G$ and $C_B$ for setting the cut-off valves of the grid-cathode voltage ($V_{GK}$) and cathode current ($I_K$) characteristics of the cathode ray tube 22 as shown in FIG. 3. The cathode currents are set on the order of several ten $\mu A$ (micro ampere).

Up/down counters 29R, 29G and 29B are provided to count clock pulses supplied thereto from the control circuit 25 and their count contents are incremented by, for example, one step every 10 $\mu$sec. The outputs from the counters 29R, 29G and 29B are respectively supplied to D/A converters 30R, 30G and 30B to be converted into analog voltages $V_A$ of a staircase waveform as shown in FIG. 2. Each analog voltage $V_A$ increases, for example, by 0.2 V every 10 $\mu$sec. The analog voltages $V_A$ from the D/A converters 30R, 30G and 30B are respectively supplied to the subtraction circuits 19R, 19G and 19B wherein they are subtracted from the red, green and blue color control levels supplied through the multipliers 18R, 18G and 18B, respectively. Accordingly, each of the red, green and blue color control levels from the subtraction circuits 19R, 19G and 19B appears as a decreasing staircase voltage $V_C$ which starts from the level of the starting point set for the cut-off value and decreases, for example, by 0.2 V every 10 $\mu$sec as shown in FIG. 2.

During the period in which the output voltages from the subtraction circuits 19R, 19G and 19B decrease, currents of gradually increasing levels will pass through the cathodes 23R, 23G and 23B of the cathode ray tube 22. When the levels of the currents flowing through the cathodes 23R, 23G and 23B exceed the currents of the constant current sources 28R, 28G and 28B, the control circuit 25 detects this condition and stops the supply of clock pulse therefrom to the counters 29R, 29G and 29B and hence the counters 29R, 29G and 29B are stopped. Therefore, the output voltage $V_A$ from each of the D/A converters 30R, 30G and 30B is kept constant thereafter and the output voltage $V_C$ from each of the subtraction circuits 19R, 19G and 19B remains set at a constant value as shown in FIG. 2. Thus, the background adjustment operation is completed. By suitably setting the constant current values of the constant current sources 28R, 28G and 28B, background adjustment for a desired color temperature can be attained.

In the example of the invention shown in FIG. 1, the counters 29R, 29G and 29B are all stopped when background adjustment is completed, and thereafter the driving level adjustment is carried out. In other words, when the currents through the cathodes 23R, 23G and 23B of the cathode ray tube 22 exceed the current values of the constant current sources 28R, 28G and 28B, respectively, slightly, all the counters 29R, 29G and 29B are stopped, and then the switch 26 is changed over from its contact B to its content D. Now, another reference voltage used for the driving level adjustment is applied from the control circuit 25, and is supplied through the switch 26 and the luminance signal processing circuit 14 to the matrix circuit 15. This reference voltage is supplied in place of the reference voltage $V_R$ which had been used for the background adjustment. However, the reference current corresponding to the reference voltage that is supplied for the driving level adjustment operation is relatively large as will be described below, so that if the cathode current flows continuously during the driving level adjustment period, as it does during the background adjustment period, the ABL (automatic brightness limiter) circuit will operate with the result that a correct driving level adjustment cannot be performed. Therefore, the reference voltage for the driving level adjusting is generated as a narrow pulse signal at a rate of, for example, several times per one horizontal period and whose peak value $V_P$ is a predetermined fixed reference level as shown in FIG. 1.

To effect driving level adjustment, the switches 27R, 27G and 27B are changed over from their contacts B to their contacts D and, hence, the collectors of the transistors 21R, 21G and 21B are grounded through constant current sources 31R, 31G and 31B, respectively. The currents of the constant current sources 31R, 31G and 31B serve to determine starting points $D_R$, $D_G$ and $D_B$ for the driving level setting shown in FIG. 3 and are selected to be on the order of 1 mA to 2 mA, respectively.

At the same time, up/down counters 32R, 32G and 32B count the clock pulses supplied thereto from the control circuit 25 and their count contents are changed one step at a time in response to each clock pulse. The outputs from the counters 32R, 32G and 32B are fed to D/A converters 33R, 33G and 33B, respectively, wherein each count is converted into an analog voltage having staircase waveform, and these analog voltages are in turn fed to the multipliers 18R, 18G and 18B to be multiplied with the constant pulse reference voltages representing the red, green and blue colors, as supplied from the matrix circuit 15, respectively.

When the currents flowing through the cathodes 23R, 23G and 23B of the cathode ray tube 22 exceed the levels established by the current values of the constant current sources 31R, 31G and 31B, the control circuit 25 detects this condition and stops the supply of the clock pulse therefrom to the counters 32R, 32G and 32B to stop the counters from counting. Thus, the output voltages from the D/A converters 33R, 33G and 33B remain constant thereafter and the driving level adjustment operation is completed.

When both the background and driving level adjustment operations have been carried out as set forth above, the switch 13 is changed over to the contact N by a control signal from the control circuit 25. Furthermore, the usual red color difference signal R-Y and blue color difference signal B-Y are delivered from the color demodulator circuit 17; and the switches 24R, 24G and 24B are turned ON.

If both the background and driving level adjustment operations are carried out in combination, as set forth above, if one adjustment is performed, the othe adjustment is affected thereby. Therefore, the above adjustments are respectively repeated 2 to 3 times.

In practice, since there is almost no change in the driving level once it is set, it may be sufficient to perform the driving level adjustment operation only when the television receiver is forwarded from the factory or when the cathode ray tube is replaced. To carry out this single driving level adjustment, non-volatile memories are inserted between the counters 32R, 32G, 32B and the D/A converters 33R, 33G and 33B to memorize, or store, the counted values of the counters 32R, 32G and 32B when they are stopped (i.e. when proper driving level adjustment has been attained), and thereafter the counters 32R, 32G and 32B are removed. That is, separate adjusting equipment is provided, including the counters 32R, 32G and 32B, to establish correct adjustment.

In an alternative arrangement the same counters which are used for the background adjustment also can be used for the driving level adjustment. In such a case, three counters are sufficient.

In yet another embodiment, a single counter is used for the background adjustment and another single counter is used for the driving level adjustment, and the adjustments carried out on the red, green and blue color levels for the background adjustment and for the driving level adjustment are executed sequentially in a time sharing manner. The overall adjustment period for this embodiment is seen to be 3 times the period for the embodiment of FIG. 1. Also, a single counter may be used for both the background adjustment and for the driving level adjustment. In this modification, it should be clear that the total time period required for the adjustments is 6 times that of the example shown in FIG. 1.

As mentioned above, the background adjustment can be carried out at any time when the power switch is turned ON, or when the channel selector is changed over or if a specially provided adjusting switch is turned ON. However, in the example shown in FIG. 1, transient changes due to the adjustment operation appear viewable to a viewer of the television receiver.

To avoid the perception or appearance of such transient changes, the background adjustment operation may be carried out during the vertical blanking period. This is achieved by incrementing the counters in the embodiment of FIG. 1 by one step every 10 $\mu$sec and stopping the counters after they have been incremented, for example, in the vicinity of 100 steps. This will result in a time period required for the adjustment on the order of about 1 m sec. Since one vertical blanking period is longer than 1 m sec, the above described adjustments can be completed within this one vertical blanking period. Further, if a single counter is commonly used for both background and driving level adjustments, or if one counter is used for background adjustment and another is used for driving level adjustment, as set forth above, the adjustments to the red, green and blue color levels may be sequentially carried out in three successive vertical blanking periods. If the adjustments are performed within the vertical blanking period as just described, since the chrominance signal inherently is not produced during the vertical blanking period it is unnecessary for control circuit 25 to block input signals to the color demodulator circuit 17.

Another embodiment which avoids the above-mentioned defect now will be described with reference to FIG. 4 in which the reference numerals are used as in FIG. 1. In this example, the background and driving level adjustment operations are achieved within the horizontal blanking periods.

Figure 4:
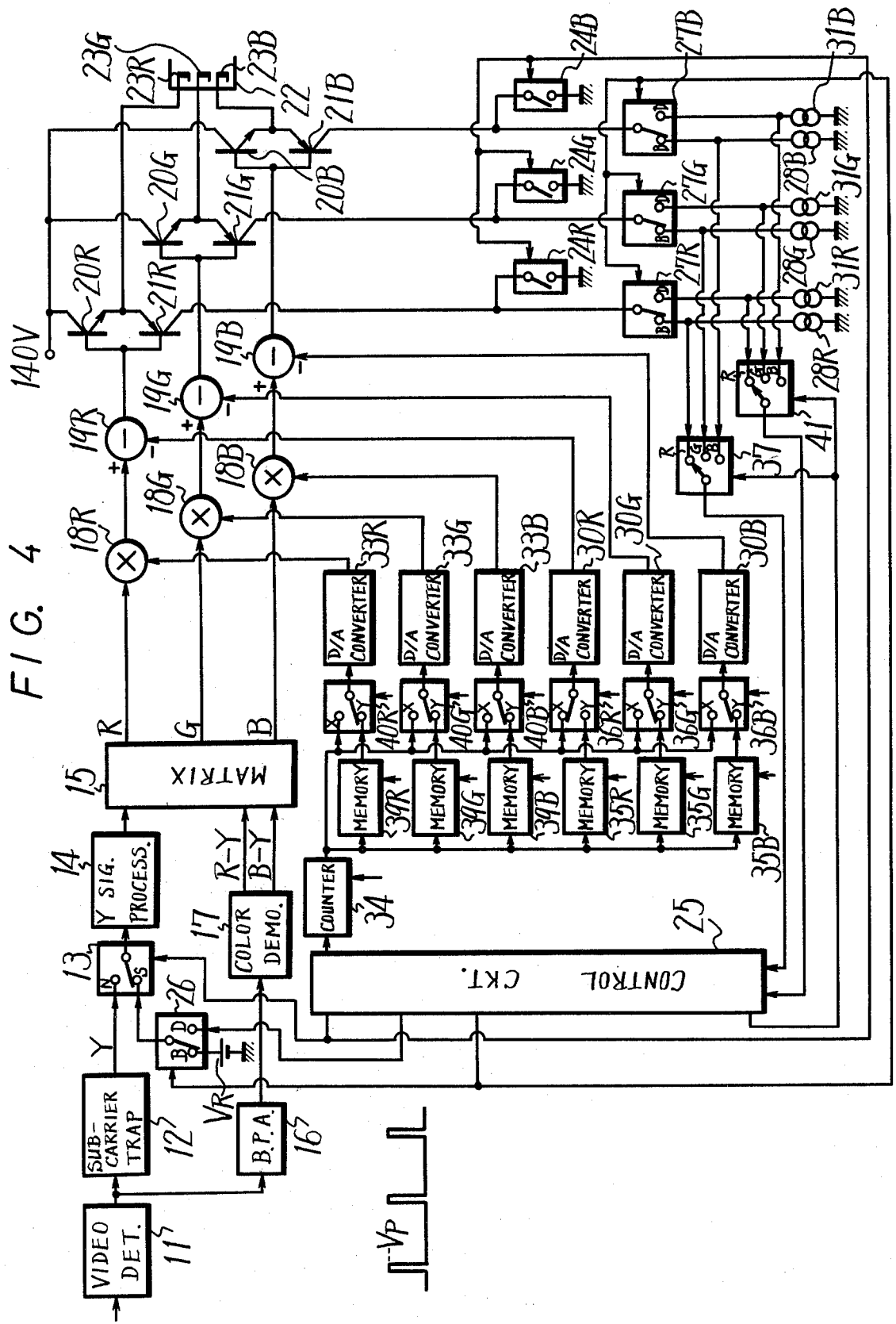
FIG. 4 is a block diagram showing another example of the invention.
Figure 5:
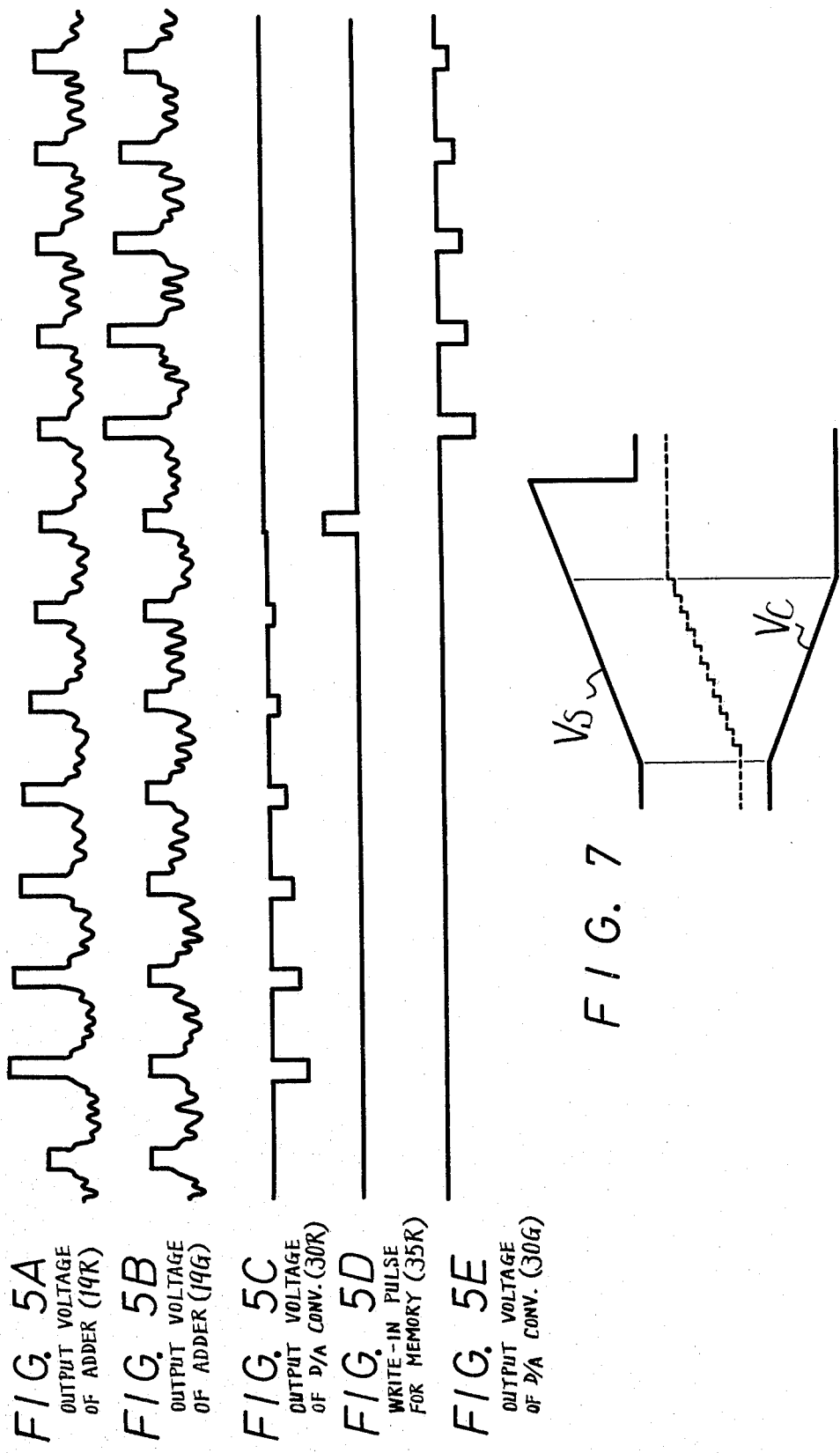
FIGS. 5A–5E are waveform diagrams which are useful to explain the example shown in FIG. 4.

In the example of FIG. 4, let it be assumed that control circuit 25 operates such that the switch 13 is changed over to its contact S, the switch 26 is changed over to its contact B, the switches 24R, 24G and 24B are all turned OFF the switches 27R, 27G and 27B are all changed over to their contacts B as shown in the figure. In this condition, the clock pulses from the control circuit 25 are counted by a single counter 34, and a switch 36R, included in the group of switches 36R, 36G and 36B, is changed over to its contact X to supply therethrough the output from the counter 34 to a D/A converter 30R, which count is converted into an analog voltage. Thus, the output voltage of the D/A converter 30R increases as counter 34 is incremented. However, the output voltage of the D/A converter 30R increases step by step only during the horizontal blanking period and is kept at a constant level during in the horizontal scanning period as shown in FIG. 5C. Accordingly, the output voltage of the subtraction circuit 19R decreases one step at a terminal horizontal blanking period as shown in FIG. 5A. The waveforms shown in FIGS. 5A and 5B schematically represent that the luminance signal Y is supplied to the matrix circuit 15 during horizontal scanning periods. Further, in the aforedescribed condition, a switch 37 is changed over at first to a contact R and hence the constant current source 28R is connected through switch 37 to the control circuit 25.

When the level of the current of the cathode 23R of the cathode ray tube 22 exceeds the current value of the constant current source 28R, this condition is detected by the control circuit 25 and a memory 35R is supplied with a write-in pulse (FIG. 5D). Thus, the value of the count attaind by counter 34 is written in the memory 35R. After completing the write-in operation for the memory 35, the switch 36R is changed over to its another contact Y to supply the output from the memory 35R to the D/A converter 30R. Accordingly, thereafter the output voltage of the D/A converter 30R is kept at a constant value corresponding to the stored value in the memory 35R as shown in FIG. 5C. That is, the output voltage of the D/A converter 30R is maintained constant throughout both the horizontal blanking period and the horizontal scanning period. Accordingly, the output voltage of the subtraction circuit 19R is set and hence the adjustment for the red color is completed.

At the same time that the switch 36R is changed over to its contact Y, the counter 34 is cleared and the switch 36G is changed over to its contact X. The adjustment operation for the green color is then carried out in the same manner as that described above for the adjustment of the red color. After the adjustment operation for the green color is completed, a similar adjustment operation for the blue color is performed.

In the foregoing manner, the output of the memories 35R, 35G and 35B are supplied through the switches 36R, 36G and 36B to the D/A converters 30R, 30G and 30B, respectively, and the background adjustment is completed.

The example of FIG. 4 requires a longer period of time for the adjustments to be completed than the example of FIG. 1, but can perform these adjustments without the undesired observation of transients.

If the driving level adjustment is carried out only when the television receiver is shipped from the factory, or when the cathode ray tube is replaced, a very simplified construction can be provided. In the example of FIG. 4 driving level adjustment is carried out in the same manner as background adjustment. Memories 39R, 39G, 39B, switches 40R, 40G, 40B, D/A converters 33R, 33G, 33B and a switch 41 are provided for such driving level adjustment. Since the operation of the driving level adjustment circuitry, which includes these elements, is similar to that of the background level adjustment circuitry, further description thereof is omitted.

In the example of FIG. 4, a single counter 34 is employed. However, it should be clear that if three counters for the adjustment of the red, green and blue colors, respectively, are provided, and, if the red, green and blue color adjustments are carried out simultaneously for background adjustment time period can be reduced by $\frac{1}{3}$.

With the examples of the invention shown in FIGS. 1 and 4, the gradually varying voltage supplied to each subtraction circuit and to each multiplying circuit is a step voltage produced by utilizing a counter. In place of the counter other types of ramp generators may be used as signal generators to provide a voltage which will vary gradually.

Figure 6:
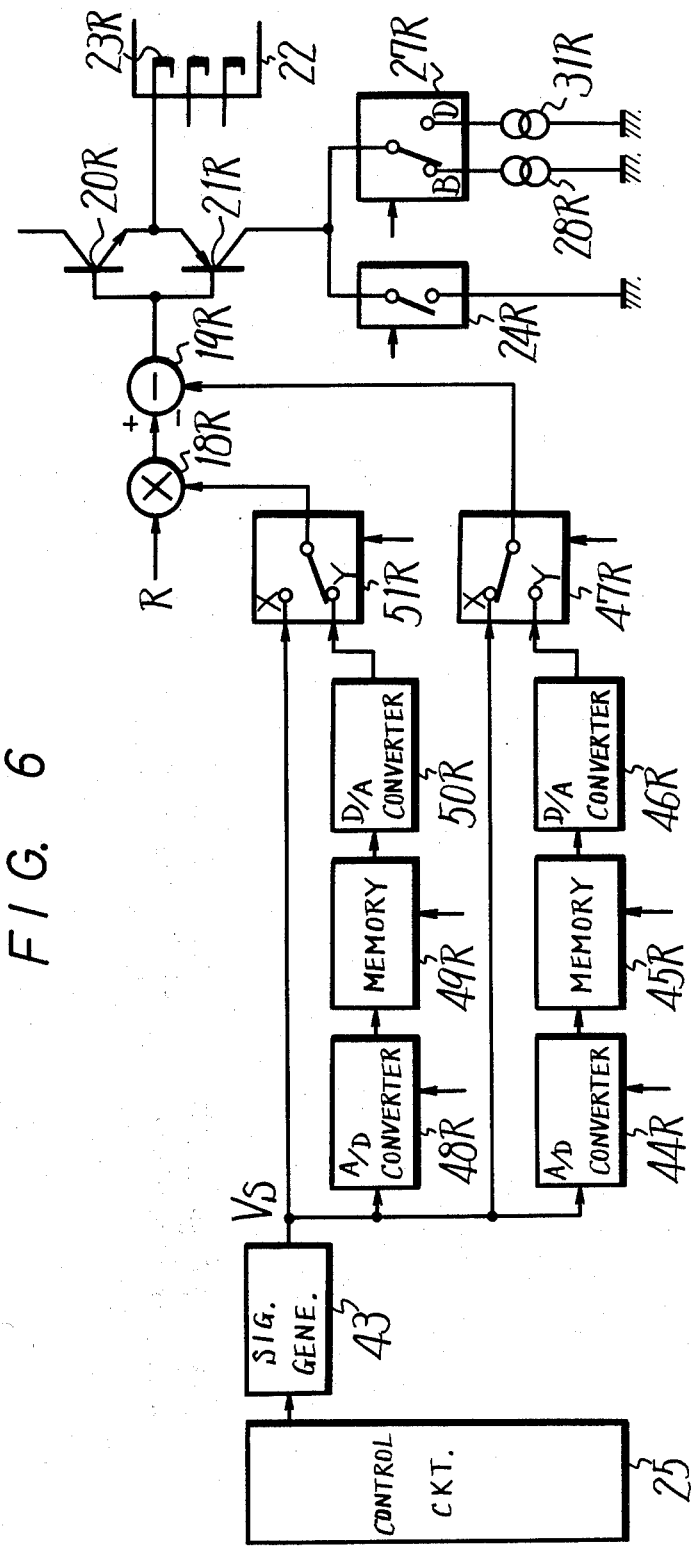
FIG. 6 is a block diagram showing a portion of a further example of the invention.

FIG. 6 shows a further example of the invention in which a signal generator, such as the ramp generator mentioned above, is used. In this example, a sawtooth wave voltage $V_S$, as shown in FIG. 7 is produced by a signal generator 43. For the background adjustment operation, a switch 47R initially is changed over to its contact X to supply the sawtooth wave voltage $V_S$ therethrough to the subtraction circuit 19R. Accordingly, the output voltage $V_C$ of the subtraction circuit 19R decreases along a constant inclination as shown in FIG. 7. The sawthooth wave voltage $V_S$ from the signal generator 43 also is fed to an A/D converter 44R wherein it is converted into a digital signal. When the level of the cathode 23R of the cathode ray tube 22 exceeds the current value of the constant current source 28R, the control circuit 25 detects this condition, and a write-in pulse is supplied to a memory 45R to write the present digital value from the A/D converter 44R thereinto. After the digital value has been written in the memory 45R, the switch 47R is changed over to its other contact Y to supply the analog representation of this digital value, as converted by a D/A converter 46R to the subtraction circuit 19R. Accordingly, the output voltage $V_C$ of the subtraction circuit 19R now becomes constant as shown in FIG. 7. The foregoing operation may be carried out by similar circuitry to obtain background adjustment for the remaining colors. The driving level adjustment can be achieved in a similar manner. In FIG. 6, an A/D converter 48R, a memory 49R, a D/A converter 50R and a switch 51R comprise circuitry to effect the driving level adjustment for the red color.

According to the present invention, each adjusting circuit operates as a closed loop during the adjusting period but operates as an open loop during the normal video display period. Consequently, the adjusting circuit may be considered as an open loop circuit. Unstable factors, such as transient responses or the like, are not caused in the invention and hence the circuit will operate stably. Further, proper adjustment can be performed in a short period of time.

Since the circuit of the present invention requires no low pass filter, when the circuit is constructed as an integrated circuit, no externally connected elements are necessary. That is, the circuit of the invention is suitable to be fabricated as an integrated circuit at low cost.

It will be apparent that many modifications and variations could be effected by one of ordinary skill in the art without departing from the spirit or scope of the novel concepts of the present invention. The appended claims should be interpreted as including such modifications and variations.

I claim as my invention:

1. An automatic brightness adjusting circuit for a cathode ray tube having at least one electrode normally supplied with a video signal, and comprising: a video signal source from which said video signal is derived; a reference signal source for supplying a reference signal; signal processing means between said video signal source and said cathode ray tube for normally processing the signals provided by said video signal source; switching means for selectively supplying a signal provided by said video signal source or said first reference signal to said signal processing means, said switching means supplying said reference signal to said signal processing means during a brightness adjusting period; control signal generating means connected to said signal processing means for supplying the latter with an adjustable control signal the level of which varies gradually; means connected to said cathode ray tube for sensing the signal level at said at least one electrode; and control means responsive to said sensed signal level for stopping said control signal generating means from varying the level of said control signal and for actuating said switching means to supply said signal provided by said video signal source to said signal processing means when the sensed signal level at said at least one electrode exceeds a predetermined value.

2. An automatic brightness adjusting circuit for a cathode ray tube according to claim 1, wherein said signal processing means includes subtracting means operable to subtract said control signal from a video reference level for background adjustment.

3. An automatic brightness adjusting circuit for a cathode ray tube according to claim 1, whereing said signal processing means includes multiplying means operable to multiply a video reference level with said control signal for driving level adjustment.

4. An automatic brightness adjusting circuit for a cathode ray tube according to claim 1, wherein said brightness adjusting period is included in the vertical blanking period of said video signal.

5. An automatic brightness adjusting circuit for a cathode ray tube according to claim 1, wherein said brightness adjusting period is comprised of successive horizontal blanking periods of said video signal.

6. An automatic brightness adjusting circuit for a cathode ray tube according to claim 1, wherein said control signal generating means comprises counter means supplied with clock pulses and a D-A converter for generating said gradually varying control signal as a function of the count of said counter means.

7. An automatic brightness adjusting circuit for a cathode ray tube according to claim 1, wherein said control signal generating means comprises a ramp generator for generating said gradually varying control signal.

8. An automatic brightness adjusting circuit for a cathode ray tube according to claim 7, wherein said ramp generator is a sawtooth wave generator.

9. An automatic brightness adjusting circuit for a cathode ray tube according to claim 8, wherein said control signal generating means further comprises an A-D converter coupled to said sawtooth wave generator, a memory circuit coupled to said A-D converter for storing a digital representation of said sawtooth wave, and a D-A converter coupled to said memory circuit.

10. An automatic brightness adjusting circuit for a color cathode ray tube having plural electrodes normally supplied with respective primary color signals, and comprising:
a color video signal source from which a color video signal having a luminance component and a chrominance component is derived;
a color demodulator responsive to said chrominance component for deriving a plurality of color difference signals;
a matrix circuit coupled to said color demodulator for matrixing said luminance component and said color difference signals to derive a plurality of primary color signals;
a reference signal source for supplying a reference signal;
a plurality of signal processing circuits between said matrix circuit and respective electrodes of said color cathode ray tube for normally receiving said plurality of primary color signals and for supplying processed primary color signals to respective ones of said plurality of electrodes; switching means for selectively supplying said luminance component or said first reference signal to said matrix circuit, said switching means supplying said first reference signal to said matrix circuit during a brightness adjusting period;
control signal generating means connected to said plurality of signal processing circuits for supplying the latter with a plurality of adjustable control signals, each having a gradually varying level, such that said plurality of signal processing circuits supply said electrodes with varying color levels during said brightness adjusting period;
means connected to said cathode ray tube for sensing the signal levels at said respective electrodes; and
control means responsive to said sensed levels for stopping control signal generating means from varying the levels of said control signals and for actuating said switching means to supply said luminance component to said matrix circuit when the sensed signal levels at said electrodes exceed predetermined levels.

11. An automatic brightness adjusting circuit for a color cathode ray tube according to claim 10, wherein said control signal generating means comprises a plurality of counters supplied with clock pulses and a plurality of D-A converters coupled to respective ones of said counters for supplying said plurality of adjustable control signals to respective ones of said plurality of signal processing circuits.

12. An automatic brightness adjusting circuit for a color cathode ray tube according to claim 10, wherein said control signal generating means comprises a common counter supplied with clock pulses, a plurality of memory circuits coupled to said common counter and a plurality of D-A converters coupled to respective ones of said memory circuits for supplying said plurality of adjustable control signals to respective ones of said plurality of signal processing circuits, and means for coupling said common counter to each of said plurality of D-A converters in time sharing manner during said brightness adjusting period.

13. An automatic brightness adjusting circuit for a color cathode ray tube according to claim 12, wherein said means for coupling said common counter to each of said plurality of D-A converters comprises a plurality of switch devices, each coupled to a respective one of said D-A converters and each selectively coupling either said common counter or a respective memory circuit to said respective D-A converter, said control means supplying individual switch activating signals to said plurality of switch devices to operate said switch devices, one at a time, to couple said common counter to said respective D-A converter and then, when the sensed signal level at a corresponding electrode exceeds its predetermined level, to couple said respective memory circuit to said respective D-A converter.

14. An automatic brightness adjusting circuit for a color cathode ray tube according to claim 13, wherein said plurality of signal processing circuits each comprises multiplying means and subtracting means connected in cascade, said multiplying means being supplied with a respective primary color signal or, during said brightness adjusting period, with a color control lever derived from said reference signal, and with a first control signal, and said subtracting means being supplied with the output of said multiplying means and with a second control signal for subtracting said second control signal from said output of said multiplying means, and thereby supply said respective electrode with a brightness-adjusted primary color signal or, during said brightness adjusting period, with a varying color control level.

15. An automatic brightness adjusting circuit according to claim 14 wherein said plurality of memory circuits comprises first and second sets of plural memory circuits, each coupled to said common counter; and said plurality of D-A converters comprise first and second sets of D-A converters coupled throught respective ones of said switch devices to respective ones of said memory circuits and to said common counter, the outputs of the plural D-A converters of said first set being coupled to respective ones of said multiplying means to supply respective first control signals thereto, and the outputs of the plural D-A converters of said second set being coupled to respective ones of said subtracting means to supply respective second control signals thereto.

16. An automatic brightness adjusting circuit for a color cathode ray tube according to claim 14, wherein said control signal generating means comprises first and second sets of plural counters, each supplied with clock pulses, and first and second sets of plural D-A converters coupled to respective ones of said counters, the plural D-A converters of said first set being coupled to respective ones of said multiplying means to supply respective first control signals thereto, and the plural D-A converters of said second set being coupled to respective ones of said subtracting means to supply respective second control signals thereto.

17. An automatic brightness adjusting circuit for a color cathode ray tube according to claim 16 wherein said control means supplies said clock pulses to said first and second sets of counters mutually exclusively and changes over the supply of said clock pulses from one to the other set when the sensed signal levels at said electrodes exceed said predetermined levels.

18. An automatic brightness adjusting circuit for a color cathode ray tube according to claim 10, wherein said control signal generating means comprises a plurality of ramp generators for supplying said adjustable control signals to respective ones of said plurality of operation circuits.

19. An automatic brightness adjusting circuit for a color cathode ray tube according to claim 10, wherein said control signal generating means comprises a common ramp generator and a plurality of storage means coupled to said common ramp generator for supplying said adjustable control signals to respective ones of said plurality of signal processing circuits, and means for coupling said common ramp generator to each of said plurality of memory circuits in time sharing manner during said brightness adjusting period.

20. An automatic brightness adjusting circuit for a color cathode ray tube according to claim 10, wherein said plurality of signal processing circuits each comprises multiplying means and subtracting means connected in cascade, said multiplying means being supplied with a respective primary color signal or, during said brightness adjusting period, with a color control level derived from said reference signal, and with a first control signal, and said subtracting means being supplied with the output of said multiplying means and with a second control signal for subtracting said second control signal from said output of said multiplying means, and thereby supply said respective electrode with a brightness-adjusted primary color signal or, during said brightness adjusting period, with a varying color control level.

* * * * *